United States Patent Office 2,806,802
Patented Sept. 17, 1957

2,806,802

MANUFACTURE OF ULTRAMARINE BLUE

Robert Bruce Van Order, Berkeley Heights, and Robert Henry Hill, Union, N. J., assignors to American Cyanamid Company, New York, N. Y., a corporation of Maine No Drawing. Application June 15, 1954, Serial No. 437,000

1 Claim. (Cl. 106—305)

This invention relates to an improved process for manufacturing ultramarine blue.

The standard commercial procedure for the manufacture of ultramarine blue involves the grinding of the raw mix, which is a mixture of aluminum silicates, soda ash, sulfur, and a reducing agent such as rosin, in a ball mill or other suitable comminuting apparatus, charging the ground mix into crucibles of fairly small size and of controlled porosity, and heating the crucibles in a furnace over a period of about two days up to a temperature of around 750° C. so as to produce primary ultramarine. The primary ultramarine is then permitted to cool in the crucibles for a long period of time, of the order of a week or two, so that slow oxidization takes place to produce the strong blue pigment of commerce known as secondary ultramarine.

In the crucible process, the time cycle is very long. Even with the best improvements which have been developed, it still takes about two weeks. The reason for this is that the heating step takes from one and one-half to two days because of the slow conduction of heat into the center of the crucibles, and the conversion step takes a long time because the volume of oxidizing gas passing through the pores of the crucible is maintained at a very low figure. These pores have to be very small, for otherwise serious overoxidation of the outer layers of the crucible charge is likely to occur, which would destroy the product for pigment purposes, transforming it into a dirty bluish-gray or white material.

In addition to the long time cycle required in the crucible process, the quality of the product has never been uniform even in a single crucible, much less in a furnace batch. Since the conversion step involves the slow diffusion of oxygen or other oxidizing gas through the pores of the crucible, it is impossible to effect the necessary control, with the result that overoxidation occurs in the outer layers of the crucible charge, underoxidation occurs in the center, and in between there is an annulus of reasonably high grade ultramarine. These effects are also obtained even when the necessary control of flow of gases occurs, if the crucibles are not uniform themselves from the standpoint of porosity. The production of a certain proportion of low-grade material reduces the yield in a given furnace and further adds to the cost. Also, the impossibility of exact control results in a variation, from batch to batch, in the shade and strength of the ultramarine produced. This necessitates the use of large storage facilities and large inventories of pigment which adds greatly to the cost of manufacture and to the efficiency of operation.

In recent years, a greatly improved ultramarine process has been developed which includes three features. The first is the use of sulfur dioxide in the conversion step. This compound oxidizes primary ultramarine to secondary ultramarine, but it does not have a sufficiently high oxidation potential to overoxidize the material. This feature is described and claimed in the Beardsley et al. patent, No. 2,441,951. The second feature is the use of a briquetted ultramarine mix instead of a loose mix. This feature is described and claimed in the Beardsley et al. patent, No. 2,441,950. The third feature is a two-step process in which the firing step is carried out in completely impervious crucibles which do not permit any gases to enter the charge, and the second or oxidation step is effected in a suitably enclosed container by means of sulfur dioxide. This feature is described and claimed in the Beardsley et al. patent, No. 2,441,952.

The improvements developed by Beardsley et al. permit very marked savings in commercial manufacture. The cycle can be shortened if a two-step process is used with sulfur dioxide, the time being reducible to the order of a week or less. There is no overoxidized or underoxidized secondary ultramarine, and the quality of the product can be maintained uniform.

In spite of the many advantages possessed by the Beardsley et al. processes, they do not effect any substantial decrease in the capital cost or operating expenses of an ultramarine plant, because use must still be made of crucibles, furnacing equipment, etc.

In accordance with the present invention, we have discovered a novel method of preparing ultramarine blue which eliminates the necessity of the raw mix preparation; eliminates the use of expensive crucibles; and eliminates the firing step in a furnace as well as the conversion stage at lower temperatures to secondary ultramarines, all of which was heretofore necessary in the manufacture of ultramarine.

Essentially our novel method involves preparing ultramarine blue from solutions of sodium sulfide or sodium polysulfides and some form of aluminum silicate such as imported English china or domestic clay. In carrying out our novel method, the clay is added to a solution of either sodium sulfide or sodium polysulfide maintained at a temperature of at least 100° C. The clay dissolves immediately, and a mixture of primary and secondary ultramarine blue precipitates. The slurry may be filtered and dried producing a good quality ultramarine.

It is a surprising feature of the present invention that the dissolution of such an insoluble material as clay occurs so readily and under such mild conditions when simply brought in contact with the sodium sulfide or polysulfide. Apparently, a chemical reaction takes place between the sodium sulfide or polysulfide and the clay with the result that the insoluble primary and/or secondary ultramarine separates out as the product of the reaction.

The primary ultramarine content of the precipitate may be converted into the secondary ultramarine of commerce by treatment with any suitable oxidizing agent, such as, for example, sodium hypochlorite, hydrogen peroxide, sodium chlorate, etc., or we may use any suitable oxidizing gas that is ordinarily used for this purpose, such as air, or sulfur dioxide as described in the Beardsley et al. patent, No. 2,441,951.

It has been found that a temperature of the order of about 100° C. is necessary for the production of ultramarine blue by the hereindescribed process. Temperatures of the order of from about 100° C. to 600° C. may advantageously be employed especially if an autoclave is used at the higher temperatures.

From the foregoing, it will be apparent that our improved process possesses many advantages over the present-day procedures for manufacturing ultramarine. No furnacing equipment is needed, and, consequently, capital expenditures are considerably reduced. Also, since no crucibles or reactive furnace gases are used for the formation of primary ultramarine, the time cycle necessary for the production of primary ultramarine is shortened considerably. Of importance also is the fact that there is no danger of overoxidizing or underoxidizing the secondary ultramarine, as is true with the standard commercial procedures, since the addition of the oxidizing agents of this invention to the primary ultramarine may be easily controlled so as to produce a uniformly high strength secondary ultramarine and in a much shorter period of time than is required in present-day practice where this is accomplished by the slow diffusion of oxidizing gases through the crucibles.

In the present-day manufacture of ultramarine blue, it is necessary to make high and low silica content blues in order to vary the shade of the product. Since the medium and high silica content blues have a mole ratio of silica to alumina of 2.0–3.0, it is necessary to add silica to the mix to achieve these ratios because the ratio of silica to alumina in the clay employed is only about 1.90. The desired increase in silica content of the finished blue of the present invention is conveniently accomplished by the addition of sodium silicate to the mix as will appear from the examples below.

It is also necessary to make high and low sulfur content blues in order to vary the shade and physical properties. Such preparations can be made in accordance with this invention by the use of sodium polysulfides of varying mole ratios of caustic to sulfur. Thus, for example, we may use $Na_2S$ or such polysulfides as $Na_2S_5$ or $Na_2S_6$ to accomplish this result. Conveniently, we may also use the available commercial preparation $Na_2S_4$.

The invention will be described in greater detail in conjunction with the following specific examples in which the parts are by weight unless otherwise specified.

Example 1

68 parts of sodium silicate, 35 parts of sodium hydroxide and 24 parts of powdered sulfur in 136 parts of water are heated to the boil until the sulfur is dissolved. 100 parts of English china clay are added to this solution and the slurry is boiled for 4 hours with the addition of water to maintain a fairly constant volume. During the digestion period the temperature ranges from 100°–105° C. The slurry is filtered, washed, and thereafter dried. A light pale blue colored material is obtained which is identifiable by X-ray diffraction examination as ultramarine blue.

Example 2

100 parts of English china clay, 68 parts of sodium silicate and 18 parts of sodium hydroxide are boiled for 2 hours in 200 parts of water. 15 parts of sodium hydroxide and 22 parts of powdered sulfur are boiled in 50 parts of water until the sulfur dissolves. The sodium polysulfide solution is slowly added to the clay suspension while maintaining the temperature of the clay suspension at 100° C. The clay suspension is digested for 4 hours while holding the temperature at around 100° C. The slurry is filtered and dried. The light pale blue material obtained is identifiable by X-ray diffraction examination as ultramarine blue.

Example 3

68 parts of sodium silicate, 68 parts of sodium hydroxide and 64 parts of powdered sulfur are boiled in 50 parts of water until the sulfur is dissolved. 100 parts of English china clay are added slowly to this solution with the formation of the green heavy mixture. The mixture is digested for six hours at a temperature of 150–160° C. The product is a pale greenish blue material which is identifiable by X-ray diffraction examination as ultramarine blue.

Example 4

68 parts of sodium silicate, 88 parts of sodium hydroxide and 80 parts of powdered sulfur are boiled in water until dissolved. 100 parts of English china clay are added to this solution. The mixture is then digested for 22 hours with the temperature controlled at 100–105° C. The product is thereafter dried, washed, and filtered. A pale greenish blue product is obtained which is identifiable by X-ray diffraction examination as ultramarine blue.

Example 5

The procedure of the preceding example is followed except that an equivalent quantity of $Na_2S_4$ is used instead of the sodium hydroxide and sulfur used therein. The same blue product is obtained which is identifiable by X-ray diffraction examination as ultramarine blue.

We claim:

The method of preparing ultramarine blue which comprises: digesting from 100 to 136 parts of clay in an aqueous solution containing 68 parts of sodium silicate and a material selected from the group consisting of sodium sulfide and sodium polysulfide resulting from the reaction in water of from 22 to 80 parts of sulfur and from 33 to 88 parts sodium hydroxide, at a temperature between 100° C. and 600° C., under superatmospheric pressure at temperatures exceeding the normal boiling point of the mixture, until the components react, thereby forming and precipitating ultramarine blue.

References Cited in the file of this patent

UNITED STATES PATENTS

| | | |
|---|---|---|
| 2,535,057 | Gessler et al. | Dec. 26, 1950 |

FOREIGN PATENTS

| | | |
|---|---|---|
| 198,212 | Great Britain | May 31, 1923 |
| 209,961 | Great Britain | Jan. 24, 1924 |
| 991,527 | France | Oct. 8, 1951 |

OTHER REFERENCES

"Scientific American" of October 1891, page 275.